3,491,127
1 - AMINO - 2 - DIHYDROXYPHENYLALKANOYL-AMINOALKYLAMINO - 4 - HYDROXY-ANTHRA-QUINONES
John F. Downey, Lexington, and Myron S. Simon, Newton Center, Mass., assignors to Polaroid Corporation, Cambridge, Mass., a corporation of Delaware
Original application Dec. 19, 1963, Ser. No. 331,721, now Patent No. 3,347,672, dated Oct. 17, 1967. Divided and this application July 24, 1967, Ser. No. 655,582
Int. Cl. C09b 1/50
U.S. Cl. 260—377
9 Claims

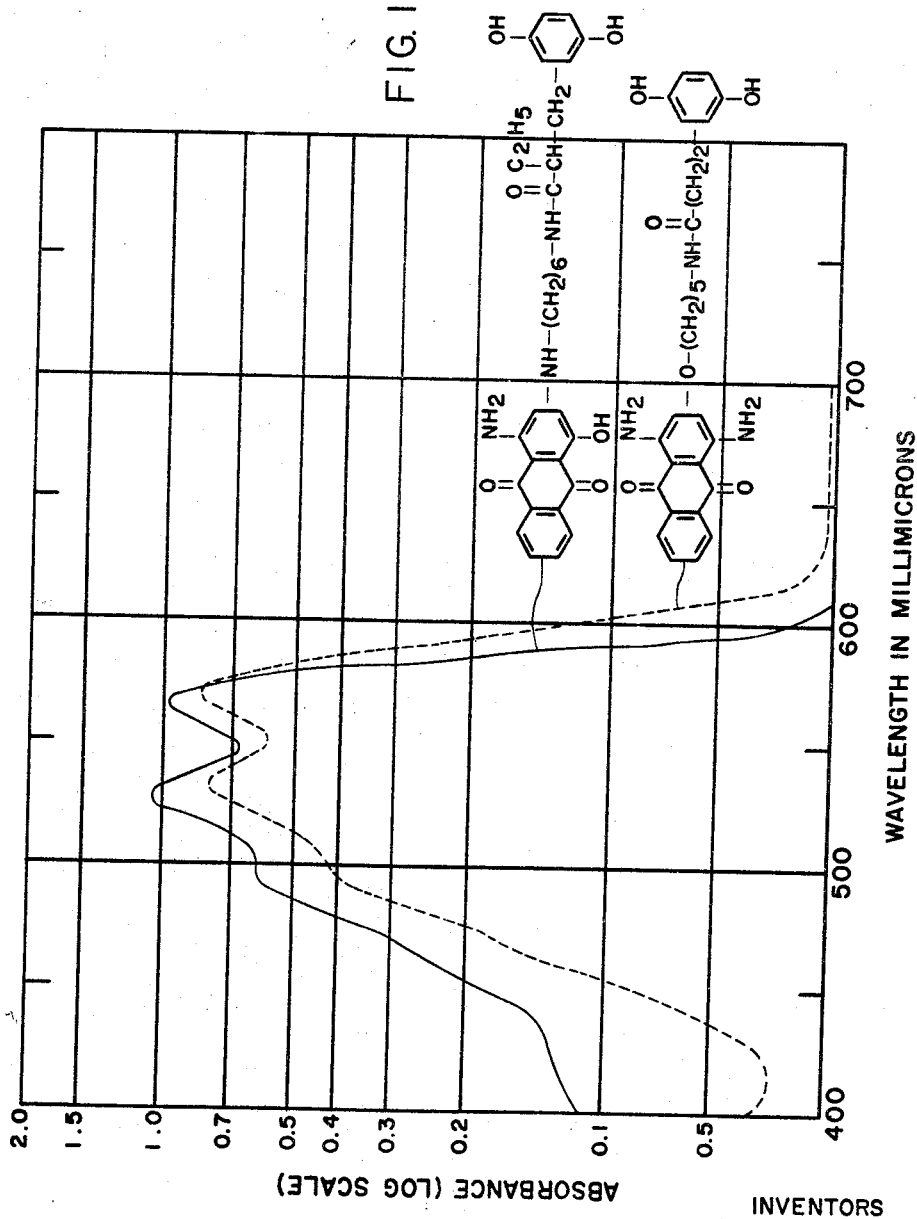

ABSTRACT OF THE DISCLOSURE

The present invention relates to novel 1-amino-4-hydroxy-anthraquinone dye developers (dyes which are also silver halide developing agents).

A primary object of this invention is to provide novel compounds of the foregoing description.

---

This application is a division of U.S. application Ser. No. 331,721, filed Dec. 19, 1963, now U.S. Patent 3,347,672.

Other objects of the invention will in part be obvious and will in part appear hereinafter.

The invention accordingly comprises the products possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIGURE 1 is a graphic illustration comparing the spectrophotometric curves of the magenta dye developers of this invention with a prior class of magenta dye developers.

U.S. Patent No. 2,983,606, issued May 9, 1961 to Howard G. Rogers, discloses diffusion transfer processes wherein a photographic negative material, such as a photographic element comprising an exposed silver halide emulsion, is developed in the presence of a dye developer to impart to an image-receiving layer a reversed or positive dye image of the developed image by permeating into said emulsion a suitable liquid processing composition and bringing said emulsion into superposed relationship with an appropriate image-receiving layer. The inventive concepts herein set forth provide novel dye developers for use in such processes.

The novel dye developers of his invention are anthraquinone dyes having the formula:

(A)
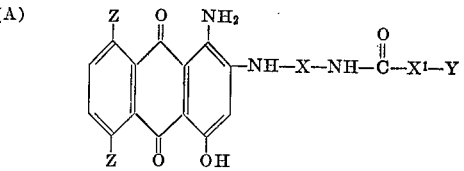

wherein each Z may be hydrogen, a hydroxy or an amino group; X and $X^1$ are alkylene radicals which may be the same or different and are preferably lower alkylene radicals; and Y is a dihydroxyphenyl silver halide developing radical, e.g., p-dihydroxyphenyl, o-dihydroxyphenyl or halogen or alkyl substituted derivatives thereof.

In the preferred embodiment, X is an alkylene radical having 3 to 6 carbon atoms and $X^1$ is an alkylene radical having 1 to 4 carbon atoms.

Alkylene radicals of greater length may be also employed, providing that the resulting dye developer is capable of being dissolved in the liquid processing composition described herein and its oxidation product rendered immobile.

As examples of suitable dye developers within the scope of Formula A, mention may be made of the following:

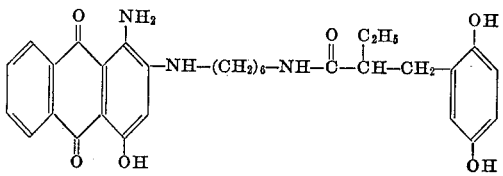

(1) 1-amino-2-(zeta-[α-ethyl-2',5'-dihydroxy-hydrocinnamido]-hexylamino)-4-hydroxyanthraquinone

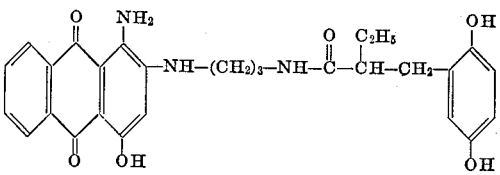

(2) 1-amino-(γ-[α-ethyl-2',5'-dihydroxy-hydrocinnamido]-propylamino)-4-hydroxy-anthraquinone

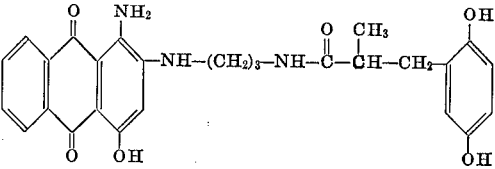

(3) 1-amino-2-(γ-[α-methyl-2',5'-dihydroxy-hydrocinnamido]-propylamino)-4-hydroxy-anthraquinone

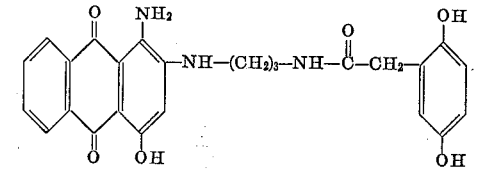

(4) 1-amino-2-(γ-homogentisamido-propylamino)-4-hydroxy-anthraquinone

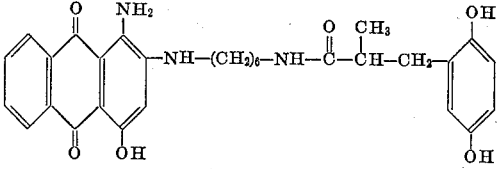

(5) 1-amino-2-(zeta[α-methyl-2',5'-dihydroxy-hydrocinnamido]-hexylamino)-4-hydroxy-anthraquinone

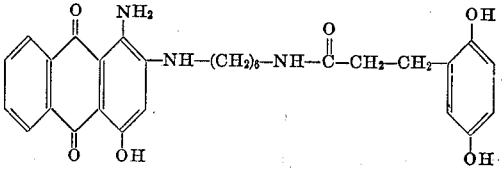

(6) 1-amino-2-(zeta-[2',5'-dihydroxy-hydrocinnamido]-hexylamino)-4-hydroxy-anthraquinone

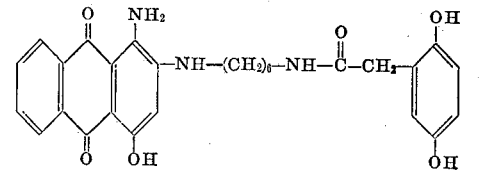

(7) 1-amino-2-(zeta-homogentisamido-hexylamino)-4-hydroxy-anthraquinone

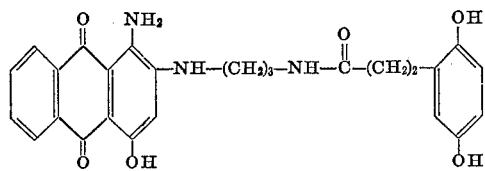

(8) 1-amino-2-(γ-[2',5'-dihydroxy-hydrocinnamido]-propylamino)-4-hydroxy-anthraquinone

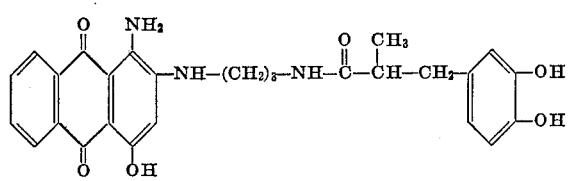

(9) 1-amino-2-(γ-[α-methyl-3',4'-dihydroxy-hydrocinnamido]-propylamino)-4-hydroxy-anthraquinone

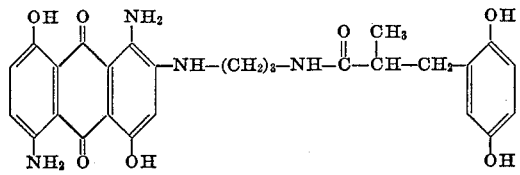

(10) 1,5-diamino-2-(γ-[α-methyl-2',5'-dihydroxy-hydrocinnamido]-propylamino)-4,8-dihydroxy-anthraquinone

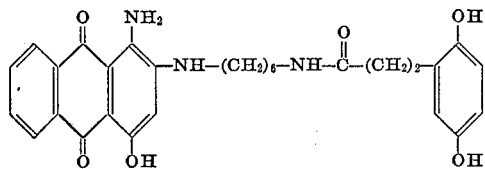

(11) 1-amino-2-(zeta[2',5'-dihydroxy-hydrocinnamido]-hexylamino)-4-hydroxy-anthraquinone

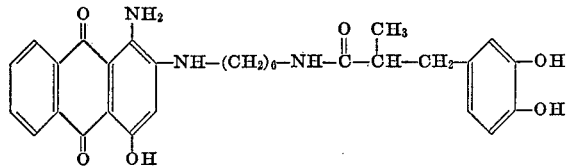

(12) 1-amino-2-(zeta-[α-methyl-3',4'-dihydroxy-hydrocinnamido]-hexylamino)-4-hydroxy-anthraquinone

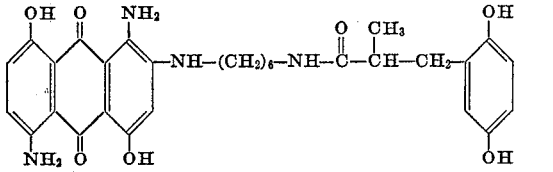

(13) 1,5-diamino-2-(zeta-[α-methyl-2',5'-dihydroxy-hydrocinnamido]-hexylamino)-4,8-dihydroxy-anthraquinone

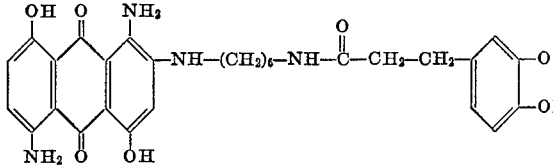

(14) 1-amino-2-(zeta-[3',4'-dihydroxy-hydrocinnamido]-hexylamino)-4-hydroxy-anthraquinone

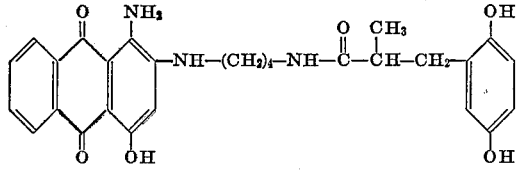

(15) 1-amino-2-(delta-[α-methyl-2',5'-dihydroxy-hydrocinnamido]-butylamino)-4-hydroxy-anthraquinone The dye developers of this invention may be prepared by reacting an anthraquinone of the formula:

(B)

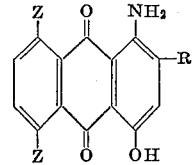

wherein R is a suitable halogen, preferably bromine, or a phenoxy group, e.g.,

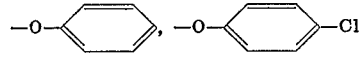

etc.; with a compound of the formula:

(C)     $NH_2-X-NH_2$ to form a compound of the formula:

(D)

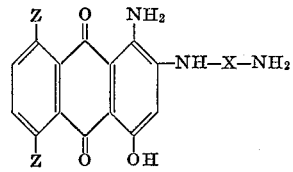

and thereafter reacting the compound of Formula D with a suitable derivative, e.g., the lactone, of an acid of the formula:

(E)     $HOOC-X^1-Y$ to form a compound of Formula A.

It will be appreciated that in Formulae B–E, Z, X, $X^1$ and Y have the meanings heretofore noted.

The compounds of Formulae B, C and E are known in the art and per se comprise no part of the present invention.

The preparation of compounds within the scope of Formula D is described and claimed in copending application Ser. No. 627,853, filed Apr. 3, 1967 in the name of J. F. Downey, a continuation-in-part of application Ser. No. 331,960, filed Dec. 19, 1963, and now abandoned.

As examples of useful compounds within the scope of Formula B, mention may be made of:

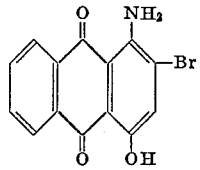

1-amino-2-bromo-4-hydroxy-anthraquinone

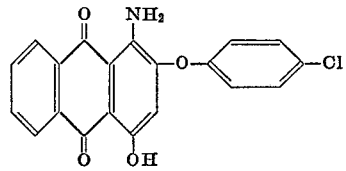

1-amino-2-(p-chlorophenoxy)-4-hydroxy-anthraquinone

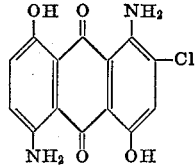

2-chloro-1,5-diamino-4,8-dihydroxy-anthraquinone

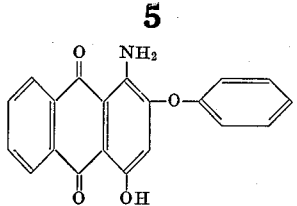

1-amino-4-hydroxy-2-phenoxy-anthraquinone

As examples of useful compounds within the scope of Formula C, mention may be made of:

$NH_2—(CH_2)_6—NH_2$
hexylene diamine $NH_2—(CH_2)_3—NH_2$
trimethylene diamine $NH_2—(CH_2)_4—NH_2$
tetramethylene diamine As examples of useful compounds within the scope of Formula E, mention may be made of:

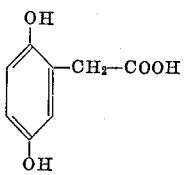

homogentisic acid

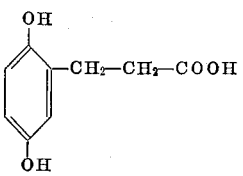

p-dihydroxyhydrocinnamic acid

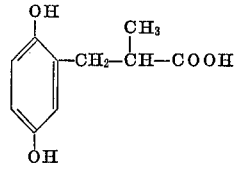

α-methyl-2,5-dihydroxy-hydrocinnamic acid

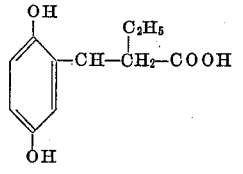

α-ethyl-2,5-dihydroxy-hydrocinnamic acid

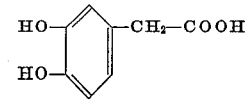

3,4-dihydroxyphenylacetic acid

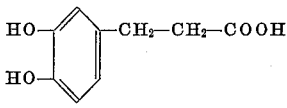

3,4-dihydroxyhydrocinnamic acid

The following nonlimiting examples illustrate the preparation of novel dye developers within the scope of this invention:

EXAMPLE 1

A solution containing 10 grams of 1-amino-2-phenoxy-4-hydroxy-anthraquinone in 100 cc. of hexylene diamine was heated on a steam bath for 3 hours, cooled, and poured into 2 liters of hexane. The resulting mixture was stirred for three-quarters of an hour and filtered. The product was reslurried in hexane and filtered. The resulting filter cake was reslurried in water and filtered. This material from the water-washing was crystallized from methyl alcohol to yield 4.9 grams of 1-amino-2-(zeta-amino-hexylamino) - 4 - hydroxy-anthraquinone, which melted at 193–196° C., and had the following structural formula:

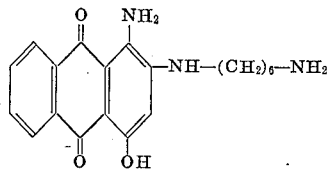

A mixture of 13.3 grams of 1-amino-2-(zeta-amino-hexylamino)-4-hydroxy-anthraquinone (prepared in the foregoing manner), 7.5 grams of α-ethyl-2,5-dihydroxy-hydrocinnamic acid lactone and 1020 cc. of toluene was heated on a steam bath for 20 hours. The resulting product was filtered and washed with hot toluene. The dried filter cake gave 15.9 grams of 1-amino-2-(zeta-[α-ethyl-2′,5′ - dihydroxy - hydrocinnamido] - hexylamino)-4-hydroxy-anthraquinone, which melted at 209–212° C.; had a spectral absorption curve with $\lambda_{max.}$ at 528 and 565 m$\mu$ in methyl Cellosolve; $\epsilon_{528}=20,600$ and $\epsilon_{565}=20,000$, and had the following structural formula:

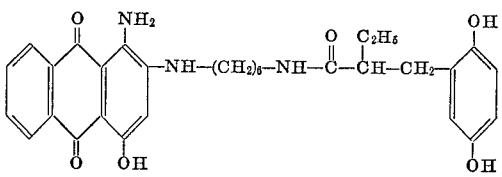

EXAMPLE 2

A mixture containing 30 cc. of 1,3-diamino-propane and 3 grams of 1-amino-2-phenoxy-4-hydroxy anthraquinone was heated on a steam bath for 20 minutes and then poured into four liters of water. The resulting precipitate when filtered and dried gave 2.2 grams of 1-amino-2-[γ-amino-propylamino]-4-hydroxy anthraquinone, which melted at 211–213° C. on crystallization from methanol, and had the following structural formula:

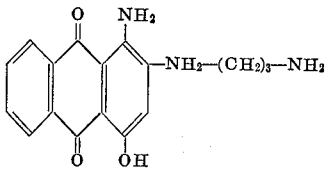

A mixture containing 1.0 gram of 1-amino-2-[γ-amino-propylamino]-4-hydroxy-anthraquinone (prepared in the foregoing manner), 0.65 gram of α-ethyl-2,5-dihydroxy-hydrocinnamic acid lactone and 100 cc. of toluene was heated on a steam bath for 20 hours. The mixture was allowed to cool to room temperature; the resulting product was filtered and washed with toluene. The dried filter cake gave 1.2 grams of 1-amino-2-(γ-[α-ethyl-2′,5′-dihydroxy - hydrocinnamido] - propylamino) - 4 - hydroxy-anthraquinone, which melted at 225–228° C.; had a spectral absorption curve with $\lambda_{max.}$ at 529 and 567 m$\mu$ in methyl Cellosolve; $\epsilon_{529}=21,800$ and $\epsilon_{567}=20,800$, and had the following structural formula:

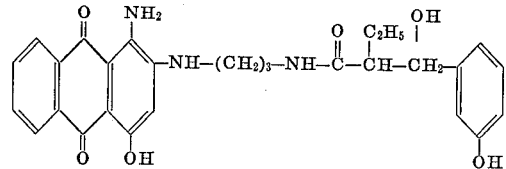

EXAMPLE 3

A mixture of 1.0 gram of 1-amino-2[γ-amino-propyl-amino]-4-hydroxy-anthraquinone (prepared as described in Example 2), 0.65 gram of α-methyl-2,5-dihydroxy-hydrocinnamic acid lactone and 100 cc. of toluene was heated on a steam bath for 20 hours. The resulting product was filtered and washed with toluene. The dried filter cake gave 1.2 grams of 1-amino-2-(γ-[α-methyl-2′,5′-hydroxy-hydrocinnamido] - propylamino) - 4 - hydroxy-anthraquinone, which melted at 225–228° C.; had a spectral absorption curve with $\lambda_{max.}$ at 529 and 567 mμ in methyl Cellosolve; $\epsilon_{529}=21{,}800$ and $\epsilon_{567}=20{,}800$, and had the following structural formula:

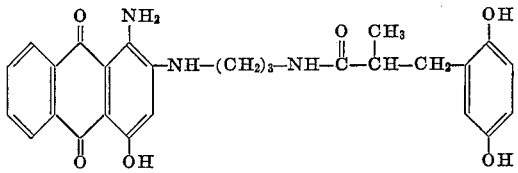

EXAMPLE 4

A mixture containing 2.0 grams of 1-amino-2-[γ-amino-propylamino]-4-hydroxy-anthraquinone (prepared as described in Example 2), 2.0 grams of homogentisic acid lactone and 200 cc. of methyl Cellosolve was heated on a steam bath for 20 hours under nitrogen. A deaerated solution of 2.0 grams of sodium hydroxide in 20 cc. of water was added to hydrolyze the excess lactone. Carbon dioxide was bubbled into the resulting mixture until neutral. The reaction mixture was poured into 2 liters of water. The resulting product was filtered off and washed with water to yield 2.7 grams of 1-amino-2-(γ-homogentisamido-propylamino)-4-hydroxy - anthraquinone, which melted at 187–199° C.; had a spectral absorption curve with $\gamma_{max.}$ at 527 and 565 mμ in methyl Cellosolve; and had the following structural formula:

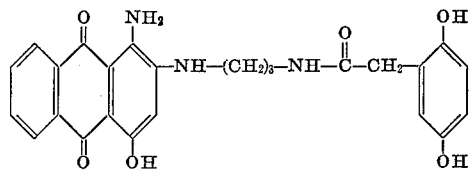

EXAMPLE 5

A mixture containing 2.0 grams of 1-amino-2-(zeta-amino - hexylamino)-4-hydroxy-anthraquinone (prepared as described in Example 1), 2.0 grams of α-methyl-2,5-dihydroxy-hydrocinnamic acid lactone and 200 cc. methyl Cellosolve was heated on a steam bath for 20 hours under nitrogen. A deaerated solution of 2.0 grams of sodium hydroxide in 20 cc. of water was added to hydrolyze the excess lactone. Carbon dioxide was bubbled into the resulting mixture until neutral. The reaction mixture was poured into 2 liters of water. The resulting product was filtered off and washed with water to yield 2.1 grams of 1-amino-2-(zeta-[α-methyl - 2′,5′ - dihydroxy-hydrocinnamido]-4-hydroxy-anthraquinone, which melted at 140–164° C.; had a spectral absorption curve with $\lambda_{max.}$ at 529 and 565 mμ in methyl Cellosolve; and had the following structural formula:

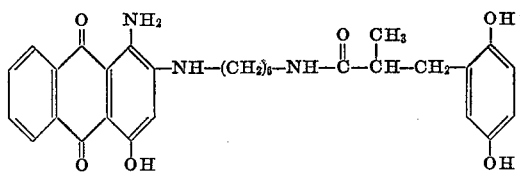

EXAMPLE 6

A mixture containing 2.0 grams of 1-amino-2-(zeta-aminohexylamino)-4-hydroxy-anthraquinone (prepared as described in Example 1), 2.0 grams of 2,5-dihydroxy-hydrocinnamic acid lactone and 200 cc. of methyl Cellosolve was heated on a steam bath for 20 hours under nitrogen. A deaerated solution of 2.0 grams of sodium hydroxide in 20 cc. of water was added to hydrolyze the excess lactone. Carbon dioxide was bubbled into the resulting mixture until neutral. The reaction mixture was poured into 2 liters of water. The resulting product was filtered off and washed with water to yield 2.1 grams of 1 - amino - 2 - (zeta - [2′,5′-dihydroxy-hydrocinnamido]-hexylamino)-4-hydroxy-anthraquinone, which melted at 134–142° C.; had a spectral absorption curve with $\lambda_{max.}$ at 527 and 565 mμ in methyl Cellosolve; and had the following structural formula:

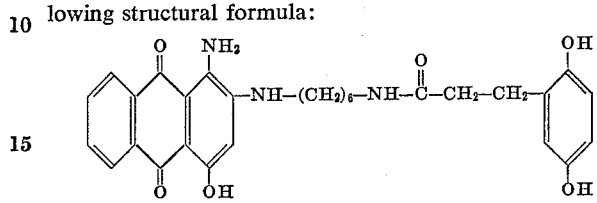

EXAMPLE 7

A mixture containing 2.0 grams of 1-amino-2-(zeta-aminohexylamino)-4-hydroxy-anthraquinone (prepared as described in Example 1), 2.0 grams of homogentisic acid lactone and 200 cc. methyl Cellosolve was heated on a steam bath for 20 hours under nitrogen. A deaerated solution of 2.0 grams of sodium hydroxide in 20 cc. of water was added to hydrolyze the excess lactone. Carbon dioxide was bubbled into the resulting mixture until neutral. The reaction mixture was poured into 2 liters of water. The resulting product was filtered off and washed with water to yield 2.4 grams of 1-amino-2-(zeta-homogentisamido-hexylamino)-4-hydroxy-anthraquinone which melted at 134–142° C., and had the following structural formula:

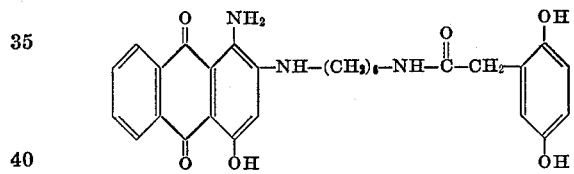

The following examples of the photographic utilization of the dye developers of this invention are given for purposes of illustration only.

EXAMPLE 8

A photosensitive element was prepared by coating a gelatin subcoated film base at a speed of 10 feet/minute with a solution comprising 0.15 gram of 1-amino-2-(zeta-[α - ethyl-2′,5′-dihydroxy-hydrocinnamido]hexylamino)-4-hydroxy-anthraquinone (Formula 1) dissolved in 5 cc. of 2% cellulose acetate hydrogen phthalate in a 50:50 mixture, by volume, of acetone and tetrahydrofuran. After this coating dried, a green-sensitive silver iodobromide emulsion was coated on at a speed of 5 feet/minute and allowed to dry. This photosensitive element was exposed for 2 seconds and processed by spreading, between the thus exposed photosensitive element and a superposed image-receiving element, an aqueous processing composition comprising:

| | |
|---|---:|
| Water _____ cc__ | 100.00 |
| KOH _____ gm__ | 11.20 |
| Zinc nitrate _____ gm__ | 0.50 |
| Hydroxyethyl cellulose (high viscosity) (commercially available from Hercules Powder Co., under the trade name of "Natrosol 250")__gm__ | 4.00 |
| Benzotriazole _____ gm__ | 3.50 |
| Sodium thiosulfate _____ gm__ | 0.50 |
| N-benzyl-α-picolinium bromide _____gm__ | 2.00 |

The image-receiving element was prepared in accordance with the disclosure of the copending application of Edwin H. Land, Ser. No. 234,864, filed Nov. 1, 1962, and comprised a layer of a 2:1 mixture, by weight, of polyvinyl alcohol and poly-4-vinylpyridine, a layer of polyvinyl alcohol, and a layer of a half-butyl ester of poly- (ethylene/maleic anhydride) coated on a baryta paper support. After an imbibition period of approximately one minute, the image-receiving element was separated and contained a magenta positive transfer image.

EXAMPLE 9

The procedure described in Example 8 was repeated, except that the dye developer was dispersed in a layer of gelatin. The coating solution from which the dye developer layer was coated was prepared by dissolving 0.40 gram of the dye developer in 0.50 cc. of N-n-butylacetanilide and 0.75 cc. of triethyl phosphate, and agitating this mixture in a Waring Blendor for one minute with a solution of 3.40 grams of 10% gelatin solution, 0.80 cc. of water, and 0.70 cc. of Alkanol B. 4 cc. of the resulting dye dispersion was added to 9 cc. of water containing 2.00 cc. of 12% aqueous saponin, and then coated on the gelatin subcoated film base at a speed of 10 feet/minute. Exposure and processing in the manner described in Example 8 yielded a magenta positive transfer image.

EXAMPLE 10

A photosensitive element was prepared by coating a gelatin subcoated film base at a speed of 10 feet/minute with a solution comprising 0.20 gram of 1-amino-2-($\gamma$-[$\alpha$-ethyl - 2',5' - dihydroxy-hydrocinnamido]-propylamino)-4-hydroxy-anthraquinone (Formula 2) dissolved in 5 cc. of 2% cellulose acetate hydrogen phthalate in a 50:50 mixture, by volume, of acetone and tetrahydrofuran. After this coating dried, a green-sensitive silver iodobromide emulsion was coated on at a speed of 5 feet/minute and allowed to dry. Exposure and processing in the manner described in Example 8 gave a magenta positive transfer image.

The addition of 0.2 gram of 4'-methylphenyl-hydroquinone to the processing solutions of Examples 8–10 gave comparable magenta images which had an appreciably lower $D_{min}$.

Substitution in the procedures described in Examples 8–10 of the other dye developers whose preparations are described above gave similar positive-transfer images.

Prior to the present invention, it had not been thought possible to prepare compounds within the scope of Formula A. In other words, it was not thought possible by one skilled in the art that reacting a compound of Formula B with a compound of Formula C would produce an amino substituent placed ortho to the amino group on the 1-amino-4-hydroxy-anthraquinone nucleus of Formula D, since attempts to substitute an amino group in the 2-position of a 1,4-diamino-anthraquinone have been unsuccessful.

Where each Z of Formula A is hydrogen, the resulting compounds are magenta dye developers possessing excellent stability and spectral absorption characteristics. In photographic processes such as are described and claimed in the aforementioned U.S. Patent No. 2,983,606, particularly in such processes for preparing multicolor images, it is extremely desirable that the dye developers employed possess the desired spectral absorption characteristics, as well as being stable to light, heat and humidity, so as to provide a stable image of the desired color. As is frequently the case, a magenta dye of the proper color, e.g., having the proper blue transmission, may not possess the desired stability. Conversely, magenta dyes having good light stability frequently are not of the proper color, especially for use in multicolor processes.

The magenta dye developers of the present invention are of particular value in that they are both highly stable and exhibit excellent color for use in preparing color images, particularly multicolor images where optimum color reproduction is desired.

Thus, while the magenta dye developers of this invention are neither the most stable heretofore known nor do they possess the most optimum spectral absorption characteristics, they are unusual in that they combine these properties to a high degree so as to provide magenta dye developers extremely useful in the aforementioned photographic processes and products, particularly in such products and processes for preparing multicolor images.

As shown in FIGURE 1, the spectrophotometric curve of a typical magenta dye developer of this invention, specifically 1 - amino-2-(zeta-[$\alpha$-ethyl-2',5'-dihydroxy-hydrocinnamido]-hexylamino)-4-hydroxy-anthraquinone, (solid line) is compared with a typical 2-alkoxy-1,4-diamino-anthraquinone magenta dye developer of the prior art, specifically 1,4 - diamino - 2 - ($\epsilon$-[2',5'-dihydroxy-hydrocinnamido] - pentoxy) - anthraquinone (dotted line), the solvent in each case being methyl Cellosol. The last-named dye developer and analogous 2-alkoxy-anthraquinone dye developers are described and claimed in the copending application of John F. Downey and Myron S. Simon, Ser. No. 152,014, filed Nov. 13, 1961.

While only a single species of each class of dye developer has been shown for purposes of comparison, it will be understood that the various species of the chromophoric systems illustrated in the drawing have substantially identical curves.

It will be observed that the $\lambda_{max}$ of the dye developers of this invention are shifted more towards the violet or a lower wavelength in the visible spectrum, and they have less absorption in the red region and more absorption in the green region of the spectrum. More specifically, the dye developer of this invention (solid line) has a spectral absorption curve with $\lambda_{max}$ at 528 and 565 m$\mu$; $\epsilon_{528}$=20,600 and $\epsilon_{565}$=20,000; while the prior 2-alkoxy dye developer (dotted line) has a spectral absorption curve with $\lambda_{max}$ at 534 and 572 m$\mu$; $\epsilon_{534}$=16,300; $\epsilon_{572}$=17,400.

The difference in spectral absorption characteristics illustrated in the graph permits the magenta dye developers of this invention to afford more desirable color balance or accuracy of color reproduction in multicolor images prepared in the manner heretofore described.

The dye developers of this invention are also useful in integral multilayer photosensitive elements for use in multicolor diffusion transfer processes. As an example of such photosensitive elements, mention may be made of the photosensitive elements disclosed and claimed in the copending U.S. application of Edwin H. Land and Howard G. Rogers, Ser. No. 565,135, filed Feb. 13, 1956, wherein at least two selectively sensitized photosensitive strata are superposed on a single support and are processed, simultaneously and without separation, with a single common image-receiving element. A suitable arrangement of this type comprises a support carrying a red-sensitive silver halide emulsion stratum, a green-sensitive silver halide emulsion stratum and a blue-sensitive silver halide emulsion stratum, said emulsions having associated therewith, respectively, a cyan dye developer, a magenta dye developer and a yellow dye developer. In one of the preferred embodiments of photosensitive elements of this type, the dye developers are disposed in separate alkali-permeable layers behind the photosensitive silver halide emulsion stratum with which they are associated.

The photosensitive elements within the scope of this invention may be used in film units which contain a plurality of photosensitive frames. The photosensitive elements of this invention are especially useful in composite roll film and film pack structures intended for use in a "Polaroid Land Camera," sold by Polaroid Corporation, Cambridge, Mass., or a similar camera structure such, for example, as the roll film type camera forming the subject matter of U.S. Patent No. 2,435,717, issued to Edwin H. Land on Feb. 10, 1948, or the film pack camera structure shown in U.S. Patent No. 2,991,702 issued to Vaito K. Eloranta on Juyl 11, 1961. In general, such composite roll films comprise a photosensitive roll, a roll of image-receiving material and a plurality of pods containing an aqueous alkaline processing solution. The rolls and pods are so associated with each other that, upon processing, the photosensitive element may be superposed on the image-receiving element and the pods may be ruptured to spread the aqueous alkaline processing solution between the superposed elements. The nature and construction of the pods used in such units are well known to the art. See, for example, U.S. Patents Nos. 2,543,181 and 2,634,886, issued to Edwin H. Hand.

The dye developers herein set forth are also useful in the formation of colored images in accordance with the photographic products and processes described and claimed in U.S. Patent No. 2,968,554, issued to Edwin H. Land on Jan. 17, 1961.

The novel compounds herein disclosed are also suitable for use as dyes for textile fibres, such as nylon.

Since certain changes may be made in the above products without departing from the scope of the invention herein involved, it is intended that all matter contained in the above description or shown in the accompanying drawing shall be interpreted as illustrative and not in a limiting sense.

What is claimed is:

1. A compound of the formula:

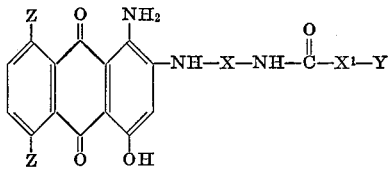

wherein each Z is selected from the group consisting of hydrogen, hydroxy and amino; X and $X^1$ are lower alkylene; and Y is o- or p-dihydroxyphenyl.

2. A compound as defined in claim 1 wherein each Z is hydrogen.

3. 1-amino-2-(zeta-[α-ethyl-2′,5′-dihydroxy - hydrocinnamido]-hexylamino)-4-hydroxy-anthraquinone.

4. 1-amino-2-(γ-[α-ethyl - 2′,5′ - dihydroxy - hydrocinnamido]-propylamino)-4-hydroxy-anthraquinone.

5. 1-amino-2-(γ-[α-methyl-2′,5′-dihydroxy - hydrocinnamido]-propylamino)-4-hydroxy-anthraquinone.

6. 1-amino-2-(γ-homogentisamido - propylamino) - 4-hydroxy-anthraquinone.

7. 1-amino-2-(zeta-[α-methyl-2′,5′ - dihydroxy - hydrocinnamido]-hexylamino)-4-hydroxy-anthraquinone.

8. 1 - amino - 2 - (zeta - [2′,5′ - dihydroxy - hydrocinnamido]-hexylamino)-4-hydroxy-anthraquinone.

9. 1-amino-2-(zeta-homogentisamido - hexylamino) - 4-hydroxy-anthraquinone.

References Cited

UNITED STATES PATENTS 2,983,606  5/1961  Rogers _____ 96—29
3,255,001  6/1966  Blout _____ 96—29

LORRAINE A. WEINBERGER, Primary Examiner

H. C. WEAVER, Assistant Examiner

U.S. Cl. X.R.

96—29; 260—380